(12) United States Patent
Saleem et al.

(10) Patent No.: US 10,483,849 B1
(45) Date of Patent: Nov. 19, 2019

(54) AUTOMATIC TRANSITION BETWEEN PFM AND PWM MODES IN A SWITCHING REGULATOR

(71) Applicant: CIREL SYSTEMS PRIVATE LIMITED, Bangalore, Karnataka (IN)

(72) Inventors: Anzal Saleem, Trivandrum (IN); Leela Madhav Lakkimsetti, Bangalore (IN); Rinu Mathew, Calicut (IN)

(73) Assignee: CIREL SYSTEMS PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/176,995

(22) Filed: Oct. 31, 2018

(30) Foreign Application Priority Data

Sep. 18, 2018 (IN) .............................. 201841035088

(51) Int. Cl.
*H02M 3/157* (2006.01)
*H02M 3/158* (2006.01)
*H02M 1/00* (2006.01)
*H02M 3/156* (2006.01)

(52) U.S. Cl.
CPC ......... *H02M 3/157* (2013.01); *H02M 3/1584* (2013.01); *H02M 3/1588* (2013.01); *H02M 2001/0009* (2013.01); *H02M 2001/0032* (2013.01); *H02M 2001/0058* (2013.01); *H02M 2003/1566* (2013.01)

(58) Field of Classification Search
CPC ............... H02M 3/157; H02M 3/1584; H02M 2001/0032; H02M 2003/1566; H02M 3/1588; H02M 2001/0009; H02M 2001/0058
See application file for complete search history.

(56) References Cited

U.S. PATENT DOCUMENTS

| 8,698,470 | B2 * | 4/2014 | Ju ......................... | H02M 3/156 323/284 |
| 2015/0214827 | A1 * | 7/2015 | Yoon ..................... | H02M 3/1588 323/286 |
| 2015/0229212 | A1 * | 8/2015 | Shiwaya ............... | H02M 3/158 323/282 |
| 2015/0346247 | A1 * | 12/2015 | Mahajan ............... | H02M 1/088 702/64 |

* cited by examiner

*Primary Examiner* — Kyle J Moody
(74) *Attorney, Agent, or Firm* — Maschoff Brennan

(57) ABSTRACT

A method for transitioning between Pulse Frequency Modulation (PFM) mode and Pulse Width Modulation (PWM) mode and vice versa, in a switching regulator is disclosed. In PFM mode, load current is estimated based on slope of waveform of the output voltage of the switching regulator. If the load current is greater than an upper threshold, then the switching regulator is set to PWM mode. In PWM mode, load current is estimated using duration of dead-time. If the duration of dead-time is higher than a pulse filter trip point, the switching regulator temporarily transitions to PFM mode. The load current is further estimated based on slope of the waveform of the output voltage and, if the load current is lower than a lower threshold, the switching regulator remains in PFM mode. If the load current is higher than the lower threshold, the switching regulator transitions back into PWM mode.

12 Claims, 5 Drawing Sheets

AUTOMATIC TRANSITION BETWEEN PFM AND PWM MODES IN A SWITCHING REGULATOR

TECHNICAL FIELD OF INVENTION

The present disclosure relates to a switching regulator. More specifically, the present disclosure relates to transitioning between a first mode and a second mode of operation of the switching regulator.

BACKGROUND OF THE INVENTION

Typically, switched mode DC-DC converters that are operable using a battery, use different modes of operation for ensuring high efficiency over a wide range of output loads. More specifically, the operation of the switched mode DC-DC converter in different modes ensures longer battery charge utilization. For example, at high load currents, fixed frequency Pulse Width Modulation (PWM) mode may provide higher efficiency compared to Pulse Frequency Modulation (PFM) mode. Similarly, at lower loads, PFM mode may provide comparable efficiency when operating at low switching frequencies. As a result, it may be required to switch between different modes in order to get the best efficiency across the whole range of output load current.

As known, there are several schemes for automatic transitioning between PFM and PWM modes of operation in a switching regulator. Typically, the load current is compared against a threshold in order to initiate the transition between PFM and PWM modes.

In one example, when the switching regulator is operating in PFM mode, the load current may be estimated using one of output voltage ripple and peak inductor current. However, the methods discussed above are highly inaccurate as they are dependent on various factors such as supply voltage, silicon process corners, temperature and tolerance of passive components used with the switching regulator.

In another example, the load current in PFM mode is estimated using the switching frequency. However, the load current estimated using the switching frequency may be inaccurate as the switching frequency is dependent on parameters such as supply voltage and temperature. Further, it is difficult to quantify the switching frequency as a function of the load current. Consequently, setting of the threshold for a given load is based on simulation rather than calculation.

In yet another example, the load current in PFM mode may be estimated using a sense resistor in the PMOS path at the output of the switching regulator. However, the conversion of sensed current to equivalent load current may not be easy. Further, the conversion of sensed current may also lead to inaccuracies in the estimated load current. Further, the sense resistor may result in additional losses in the PMOS path.

In yet another example, load current of a switching regulator operating in PWM mode is estimated based on a dead-time. However, as the dead-time depends on factors such as supply voltage and silicon process corners, the load current estimated may be inaccurate.

Therefore, there is a need in the art to accurately transition between PFM and PWM modes.

SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

An example of a method of transitioning a switching regulator from a Pulse Frequency Modulation mode to a Pulse Width Modulation mode is disclosed. The method comprises measuring a load current in the Pulse Frequency Modulation mode. The load current is measured at an output of the switching regulator by deriving slope of waveform of output voltage of the switching regulator during a dead-time of the switching regulator. The method further comprises determining a current threshold setting to be one of an upper threshold and a lower threshold. The method further comprises transitioning the switching regulator from the Pulse Frequency Modulation mode to Pulse Width Modulation mode when the load current measured is greater than the upper threshold.

An example of a method of transitioning a switching regulator from a Pulse Width Modulation mode to a Pulse Frequency Modulation mode is disclosed. The method comprises determining a current threshold setting for a load current and a pulse filter trip point. The current threshold setting is determined to be one of an upper threshold and a lower threshold, and the switching regulator is in the Pulse Width Modulation mode when the load current is above the upper threshold. The method further comprises measuring a dead-time of the switching regulator to estimate the load current in Pulse Width Modulation mode. The method further comprises transitioning to Pulse Frequency Modulation mode, tentatively, when the dead-time is greater than the pulse filter trip point, for estimating the load-current. The load current is estimated in the Pulse Frequency Modulation mode by deriving a slope of a waveform of an output voltage of the switching regulator during the dead-time. The method further comprises continuing operation in the Pulse Frequency Modulation mode when the load current estimated is lower than the lower threshold or transitioning back to the Pulse Width Modulation mode from the Pulse Frequency Modulation mode when the load current estimated is higher than the lower threshold. The pulse filter trip point is further modified to increase the dead-time after tentative transition to the Pulse Frequency Modulation mode.

An example of a circuit for automatically transitioning from a Pulse Width Modulation mode to a Pulse Frequency Modulation mode and vice-versa is disclosed. The circuit comprises a zero crossing detector configured to receive a voltage from a switching regulator. The circuit further comprises a multiplexer configured to receive a control signal for selecting a pulse filter trip point from a plurality of pulse filter trip points. The circuit further comprises a pulse filter configured to receive the outputs of the zero crossing detector and the multiplexer configured for selecting the pulse filter trip point. The pulse filter measures a duration of dead-time in an output voltage of the switching regulator, based on the outputs of the zero crossing detector and the multiplexer configured for selecting the pulse filter trip point. The circuit further comprises a current sense circuit configured to receive a voltage from an LC filter circuit. The voltage from the LC filter circuit is dependent on the output voltage of the switching regulator. Further, an output of the current sense circuit is indicative of a load current of the switching regulator. The circuit further comprises a multiplexer configured to receive a control signal for selecting a current threshold setting. The current threshold setting is selected as one of an upper threshold and a lower threshold. The circuit further comprises a current comparator circuit configured to compare the outputs of the current sense circuit and the multiplexer configured for selecting the current threshold setting. The circuit further comprises a digital control logic configured to provide control signal to the multiplexer configured for selecting the pulse filter trip point, to provide control signal to the multiplexer configured for selecting the current threshold setting and to generate a mode select signal for selecting one of a Pulse Width Modulation mode and a Pulse Frequency Modulation mode of operation. The digital control logic generates the control signals and the mode select signal based on outputs of the pulse filter and the current comparator circuit.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosure will be described and explained with additional specificity and detail with the accompanying figures in which.

Figure 1A:
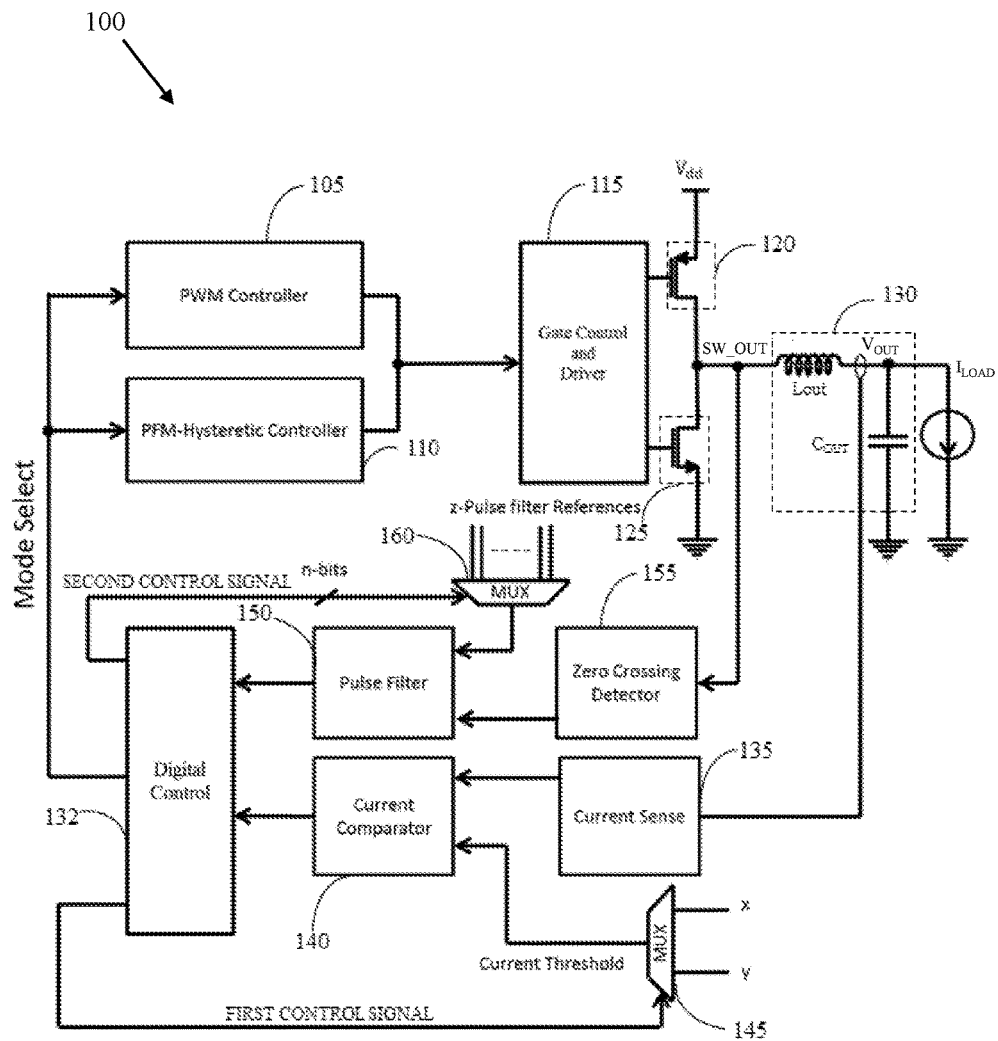
FIG. 1A illustrates a switching regulator, in accordance with one embodiment of the present disclosure.

Further, persons skilled in the art to which this disclosure belongs will appreciate that elements in the figures are illustrated for simplicity and may not have been necessarily drawn to scale. Furthermore, in terms of the construction of the circuit, one or more components of the circuit may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DESCRIPTION OF THE INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more circuits or sub-circuits or elements or structures or components preceded by "comprises . . . a" does not, without more constraints, preclude the existence of other circuits, other sub-circuits, other elements, other structures, other components, additional devices, additional sub-circuits, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The circuits, methods, and examples provided herein are illustrative only and not intended to be limiting.

The present disclosure relates to automatic transitioning between PWM mode and PFM mode in a switching regulator. The transitioning between the PWM mode and the PFM mode is performed based on a load current at the output of the switching regulator. In the PFM mode, the load current is estimated based on slope of a waveform of the output voltage of the switching regulator. If the load current is greater than an upper threshold, then the switching regulator transitions to PWM mode. In the PWM mode, the load current is estimated based on the duration of dead-time of the switching regulator. The estimated load current is further compared against one of an upper threshold and a lower threshold for transitioning between the PWM mode and the PFM mode.

Embodiments of the present disclosure will be described below in detail with reference to the accompanying figures.

Referring to FIG. 1A, a switching regulator 100 is shown, in accordance with one embodiment of the present disclosure. The switching regulator 100 comprises a PWM controller 105, a PFM hysteretic controller 110 and a gate control circuit 115 responsive to the output of the PWM controller 105 and/or the PFM hysteretic controller 110. The gate control circuit 115 further drives the gate terminals of a P-MOSFET 120 and an N-MOSFET 125 based on output of one of the PWM controller 105 and the PFM hysteretic controller 110. The P-MOSFET 120 and the N-MOSFET 125 are arranged in push-pull configuration with the source terminal of the P-MOSFET 120 connected to a positive voltage supply VDD and the source of the N-MOSFET 125 grounded. Further, voltage SW_OUT at the common switch node P is formed by joining the drain terminals of the P-MOSFET 120 and the N-MOSFET 125, and is provided to a low pass LC filter 130. The low pass LC filter circuit 130 is formed using an inductor L and a capacitor $C_{OUT}$.

The switching regulator 100 further comprises a digital control logic 132. The digital control logic 132 is used for selecting one of a PFM mode and a PWM mode based on the load current at the output of the low-pass LC filter circuit 130 (which is also the output of the switching regulator). More specifically, the digital control logic 132 triggers the PWM mode by selecting the PWM controller 105 or the PFM mode by selecting the PFM hysteretic controller 110 based on the load current estimated.

In the PFM mode, the load current is estimated and compared against an upper threshold 'y' using a current sense circuit 135, a current comparator circuit 140 and a first multiplexer 145. Similarly, in the PWM mode, the load current is approximately estimated using a pulse filter 150, a zero crossing detector 155 and a second multiplexer 160 in addition to the current sense circuit 135, the current comparator circuit 140 and the first multiplexer 145. The current sense circuit 135 and the current comparator circuit 140 is not used in PWM mode, because the current sense circuit 135 has a large wake-up time. The large wake-up time of the current sense circuit 135 causes inaccurate estimation of the load current $I_{LOAD}$ in the PWM mode, as the frequency of operation is much higher in PWM mode compared to the PFM mode of operation.

Figure 1B:
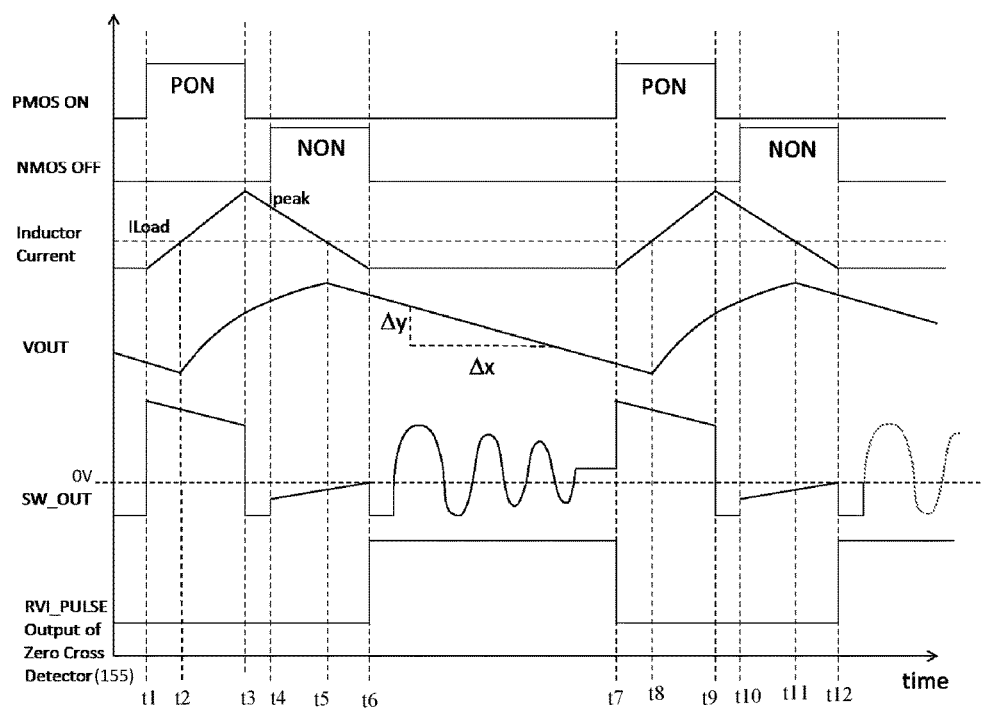
FIG. 1B illustrates switching cycle of the switching regulator.

Referring to FIG. 1B, switching cycles of the switching regulator 100 in the PFM mode is illustrated, in accordance with one embodiment of the present disclosure. As can be seen, load voltage $V_{OUT}$ is dependent on the charge across the load capacitor $C_{OUT}$. Consequently, when the load capacitor $C_{OUT}$ discharges, the load voltage $V_{OUT}$ reduces. At an instant t1, the load voltage $V_{OUT}$ falls below a lower trip point of the PFM hysteretic controller 110 and the P-MOSFET 120 is turned ON. Consequently, the inductor current in the inductor $L_{out}$ starts building up at time t1. Further, the load capacitor $C_{OUT}$ starts charging at time t2. When the inductor current reaches a predefined value at time t3, the P-MOSFET 120 is turned OFF. Further, the N-MOSFET 125 is turned ON at time t4, after a non-overlap time t4–t3 resulting in a fall in the inductor current. At time t5, when the inductor current falls below the load current $I_{LOAD}$, the load capacitor $C_{OUT}$ starts discharging. Upon detecting the fall in inductor current, a reverse current detection circuit (not shown) turns OFF the N-MOSFET 125 at time t6. Now, both the P-MOSFET 120 and the N-MOSFET 125 remain in OFF state until the output of the switching regulator 100 trips at the lower trip point of the PFM hysteretic controller 110 at time t7. The period from time t6 to time t7 when both the P-MOSFET 120 and the N-MOSFET 125 are in OFF state is called the dead-time of the switching cycle. At the lower trip point, the PFM hysteretic controller 110 turns on the P-MOSFET 120 again. Further, the switching cycle from t1 to t6 repeats during t7 to t12.

The switching cycles of the switching regulator 100 in PWM mode is similar to the switching cycles in PFM mode.

Figure 1C:
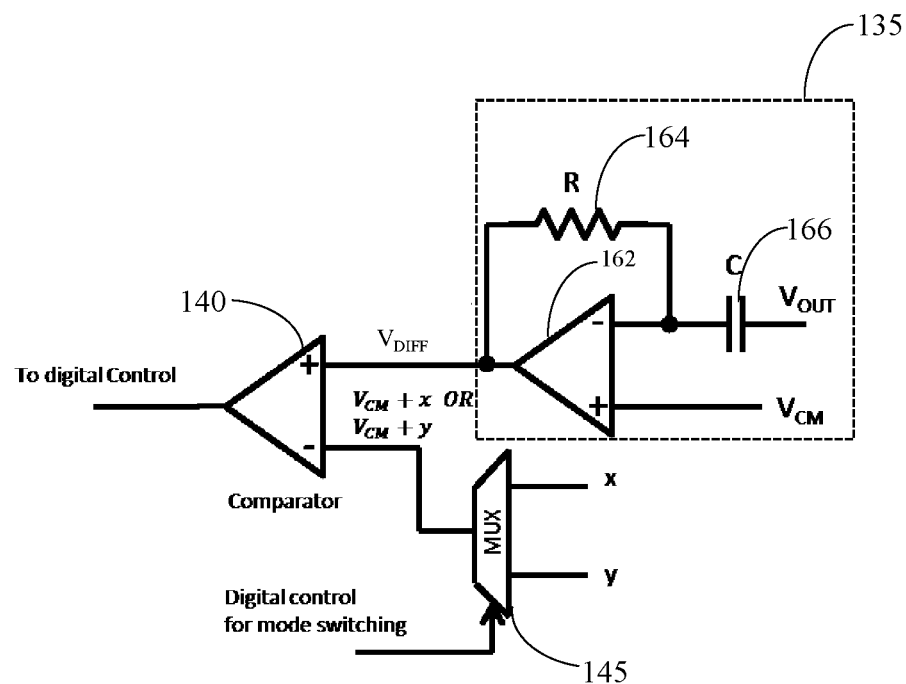
FIG. 1C illustrates combination of a current sense circuit, a current comparator circuit and a first multiplexer, in accordance with one embodiment of the present disclosure.

Referring to FIG. 1C, an implementation of the current sense circuit 135, the current comparator circuit 140 and the first multiplexer 145 is shown, in accordance with one embodiment of the present disclosure. In the present embodiment, the current sense circuit 135 and the current comparator circuit 140 are implemented using operational amplifiers (op-amps). The current sense circuit 135 comprises a first op-amp 162, a first resistor 164 and a first capacitor 166. The first resistor 164 is connected as a feedback resistor between the inverting terminal and output terminal of the first op-amp 162. Further, the first capacitor 166 is used as a coupling capacitor for filtering DC components of the output voltage $V_{OUT}$ at the inverting terminal of the first op-amp 162.

The output of the current sense circuit 135 may be written as:

$$V_{DIFF} = m \times R \times C + V_{CM}$$

where R is the resistance value of the first resistor 164, C is the capacitance value of the first capacitor 166 and m is the slope of the waveform of the output voltage $V_{OUT}$ of the switching regulator, i.e., $$m = \frac{dVOUT}{dt}$$

and $V_{CM}$ is the common mode voltage on the non-inverting terminal of the first op-amp 162. Referring back to FIG. 1B, the load current $I_{LOAD}$ may be written as $$I_{LOAD} = C_{out} \frac{dVout}{dt}$$

when the P-MOSFET 120 and the N-MOSFET 125 are off. Consequently, the equation may be re-written as:

$$V_{DIFF} = \frac{I_{LOAD}}{C_{OUT}} \times R \times C \times V_{CM}$$

The voltage $V_{DIFF}$ at the output of the current sense circuit 135 is further provided to the current comparator circuit 140. In the present embodiment, the current comparator circuit 140 is a second op-amp and the output $V_{DIFF}$ of the current sense circuit 135 is provided to the non-inverting terminal of the second op-amp. The second op-amp further compares the output $V_{DIFF}$ against a current threshold. The current threshold is set as one of an upper threshold 'y' and a lower threshold 'x' using the first multiplexer 145, depending on whether the switching regulator 100 is operating in PFM mode or PWM mode respectively.

The first multiplexer 145 is a 2:1 multiplexer having two input lines, one select line and one output line. The select line is used to provide a first control signal from the digital control logic 132 to the first multiplexer 145. The first control signal is a one-bit control signal applied on the select line. In one example, the output of the first multiplexer 145 may be set to the upper threshold voltage y when the value of the first control signal is 0 and the lower threshold voltage x when the first control signal is 1. More specifically, when the output of the first multiplexer 145 is set to the upper threshold 'y', the current comparator circuit 140 compares the output $V_{DIFF}$ of the current sense circuit 135 to a voltage $V_Y + V_{CM}$ corresponding to the upper threshold 'y'. Further, if $V_{DIFF}$ is greater than the voltage $V_Y + V_{CM}$, then the output of the current comparator circuit 140 is HIGH. Similarly, when the output of the first multiplexer 145 is set to the lower threshold 'x', the current comparator circuit 140 compares the output $V_{DIFF}$ of the current sense circuit 135 to a voltage $V_X + V_{CM}$ corresponding to the lower threshold 'x'. Further, if $V_{DIFF}$ is greater than the voltage $V_X + V_{CM}$, then the output of the current comparator circuit 140 is HIGH. Otherwise, if the voltage $V_{DIFF}$ is lower than the output of the first multiplexer 145, the output of the current comparator circuit 140 is LOW. The digital control logic 132 further generates a 'mode select signal' for selecting between the PWM mode and the PFM mode of operation, based on the output of the current comparator circuit 140.

For example, if the output of the first multiplexer 145 is set to the upper threshold 'y' and the output of the current comparator circuit 140 is HIGH, then the digital control logic 132 selects the PWM mode. If the output of the first multiplexer 145 is set to the lower threshold 'x' and the output of the current comparator circuit 140 is LOW, then the digital control logic 132 selects the PFM mode.

Figure 1D:
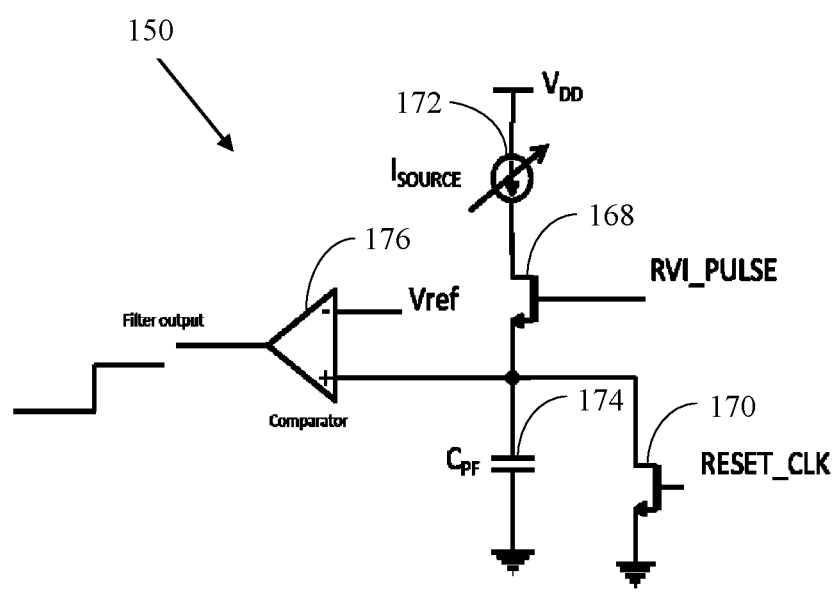
FIG. 1D illustrates a pulse filter, in accordance with one embodiment of the present disclosure.

Referring to FIG. 1D, the pulse filter 150 is shown in accordance with one embodiment of the present disclosure. In the present embodiment, the pulse filter 150 comprises a first N-MOSFET 168, a second N-MOSFET 170, a variable current source 172, a second capacitor 174 and a third op-amp 176. The drain of the first N-MOSFET 168 is connected to the variable current source 172. The variable current source 172 draws the current from the power supply VDD. Further, the source of the first N-MOSFET 168 is connected to the drain of the second N-MOSFET 170, while the source of the second N-MOSFET 170 is grounded. Furthermore, the second capacitor 174 is connected between the drain of the second N-MOSFET 170 and ground.

The zero crossing detector 155 along with the pulse filter 150 is used to determine duration of the dead-time of the switching regulator 100. The dead-time refers to the period when both the N-MOSFET 125 and the P-MOSFET 120 are OFF. When the current in the inductor is positive and when the N-MOSFET 125 is ON, the voltage SW_OUT is negative and as the current in the inductor reverses, the voltage SW_OUT goes from negative to positive. The zero crossing detector 155 detects the current reversal and turns OFF the N-MOSFET 125 as the current reverses, signalling the start of the dead-time. Consequently, the RVI_PULSE signal goes HIGH. The dead-time extends for a period till the P-MOSFET 120 is turned ON again, where the RVI_PULSE goes LOW. Therefore, the period for which the RVI_PULSE is HIGH gives the dead-time information and is measured using the pulse filter 150.

When RVI_PULSE is HIGH, the second capacitor 174 charges from the variable current source 172 through the first N-MOSFET 168. The charge in the second capacitor 174 is reset during every cycle by switching on the second N-MOSFET 170 using the N-MOSFET ON signal. In other words, the second capacitor 174 discharges to ground through the second N-MOSFET 170 after every switching cycle. Consequently, as the load current $I_{LOAD}$ reduces, the pulse width of RVI_PULSE increases and the second capacitor 174 charges to a larger value in each switching cycles.

The voltage across the second capacitor 174 is continuously compared against a pulse filter trip point z using the third op-amp 176. More specifically, the voltage across the second capacitor 174 is provided on the non-inverting terminal of the third op-amp 176 and the pulse filter trip point z is provided on the inverting terminal of the third op-amp 176. The pulse filter trip point z may take a plurality of values z1, z2 . . . zn, where z1>z2, z2>z3, z3>z4 and so on. The second multiplexer 160 selects pulse filter trip point z from among the plurality of values z1, z2, . . . zn based on a second control signal received from the digital control logic 132. For example, consider that the second multiplexer 160 is an 8:1 multiplexer with 8 input lines (z1, z2, z3 . . . z8), 3 select lines and 1 output line. In this case, a 3 bit second control signal is applied on the select lines. When the value of the second control signal is 000, the output of the second multiplexer 160 is z1. Similarly, when the value of the second control signal is 001, the output is z2 and so on.

The third op-amp 176 produces a HIGH output when the voltage across the second capacitor 174 is greater than the voltage corresponding to the pulse filter trip point 'z' and LOW output when the voltage across the second capacitor 174 is lower than the voltage corresponding to the pulse filter trip point 'z'. When the output of the third op-amp 176 is HIGH, the digital control logic 132 causes the switching regulator 100 to transition to PFM mode. In other words, the 'mode select signal' is modified to select the PFM hysteretic controller for operation. Otherwise, when the output of the third op-amp 176 is LOW, the switching regulator 100 remains in PWM mode.

Figure 2A:
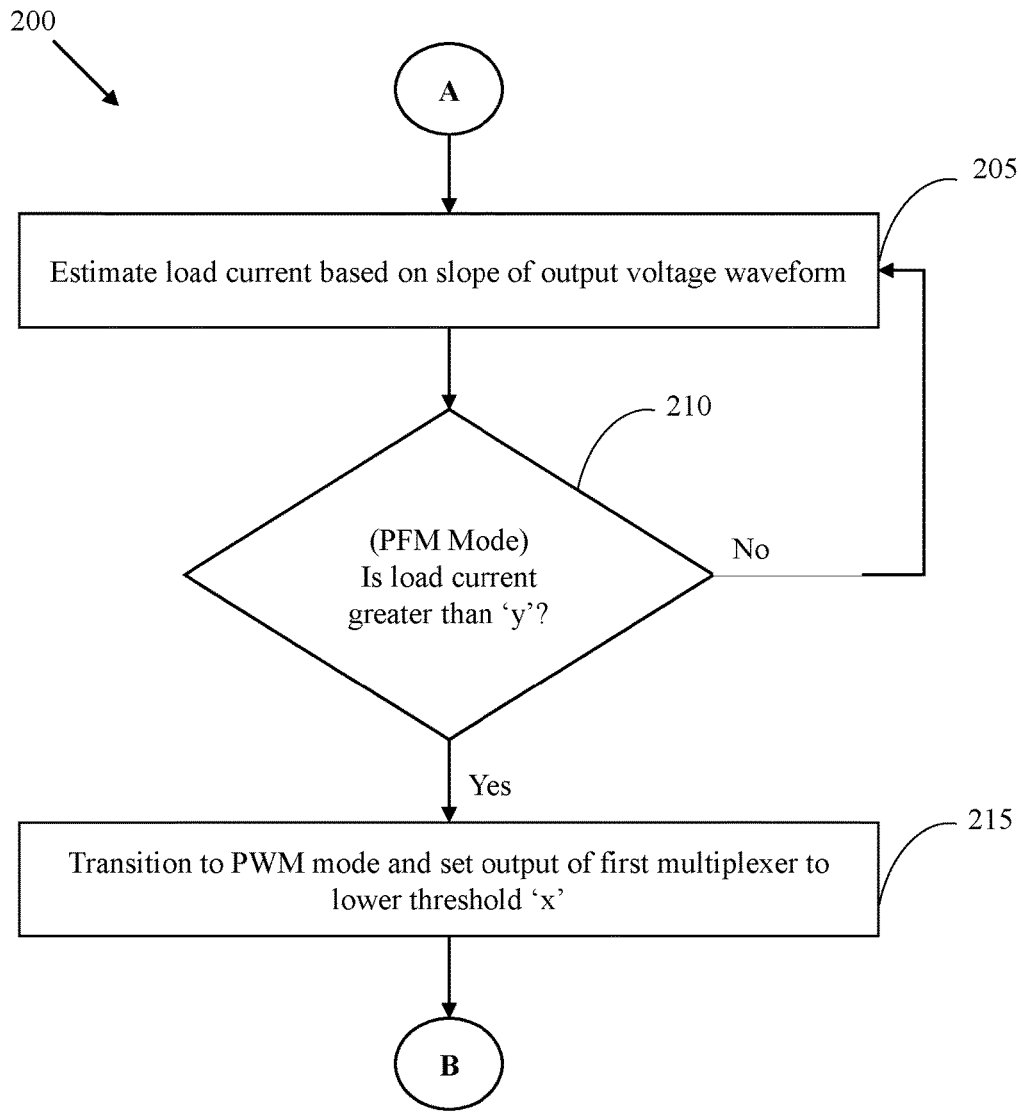
FIG. 2A shows a process of transitioning from a PFM mode to PWM mode, in accordance with one embodiment of the present disclosure.
Figure 2B:
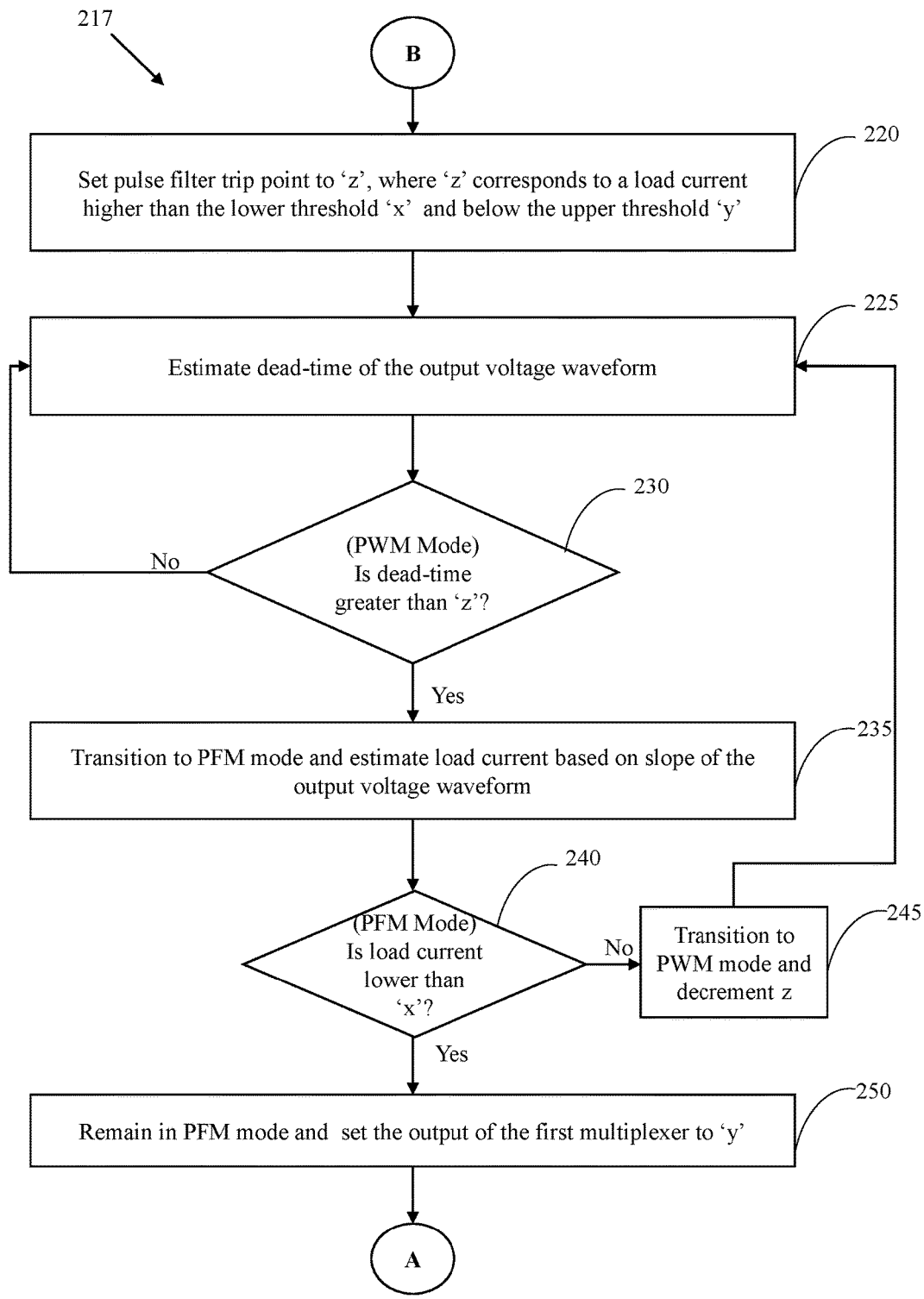
FIG. 2B shows a process of transitioning from a PWM mode to PFM mode, in accordance with one embodiment of the present disclosure.

The process of transitioning between the PFM mode and the PWM mode is explained in detail using FIGS. 2A and 2B.

Referring to FIG. 2A, in conjunction with FIGS. 1A, 1B and 1C, a process 200 of transitioning from a PFM mode to PWM mode is shown, in accordance with one embodiment of the present disclosure. In the PFM mode, the output of the first multiplexer 145 is set to the upper threshold 'y'.

At step 205, the load current $I_{LOAD}$ is estimated periodically using the current sense circuit 135. More specifically, the load current $I_{LOAD}$ is estimated based on the slope of the output voltage $V_{OUT}$ of the switching regulator 100 when both N-MOSFET 125 and P-MOSFET 120 switches are OFF.

At step 210, the load current $I_{LOAD}$ is compared against the current threshold set using the first multiplexer 145, i.e., the upper threshold 'y'. In other words, the current comparator circuit 140 periodically checks whether the output $V_{DIFF}$ of the current sense circuit 135 becomes greater than a voltage $V_Y+V_{CM}$ corresponding to the upper threshold 'y'. If the output $V_{DIFF}$ of the current sense circuit 135 is greater than $V_Y+V_{CM}$, then step 215 is performed. Otherwise, step 205 is repeated.

At step 215, the output of the current comparator circuit 140 becomes HIGH. Subsequently, the digital control logic 132 causes the switching regulator 100 to switch to PWM mode and the output of the first multiplexer 145 is set to the lower threshold 'x'. In other words, the PWM controller 105 is triggered.

Referring to FIG. 2B, in conjunction with FIGS. 1A, 1B and 1C, a process 217 of transitioning from a PWM mode to PFM mode is shown, in accordance with one embodiment of the present disclosure. In the PWM mode, the output of the first multiplexer 145 is set to the lower threshold 'x'.

At step 220, the pulse filter trip point z is set at a high value, say z1, where the load current $I_{LOAD}$ corresponding to z1 is above the lower threshold 'x' and below the upper threshold 'y' and the output of the first multiplexer 145 is set to the lower threshold 'x'.

At step 225, duration of the dead-time is estimated using the zero crossing detector 155 and the pulse filter 150. As explained earlier, the output RVI_PULSE of the zero crossing detector 155 is HIGH during the dead-time of the switching regulator. The output RVI_PULSE from the zero crossing detector 155 is further provided to the pulse filter 150.

At step 230, the pulse filter 150 compares the dead-time estimated against the pulse filter trip point z. If the dead-time is lower than the pulse filter trip point z, then step 225 is repeated. Otherwise, if the dead-time is above the pulse filter trip point z, then step 235 is performed.

At step 235, the digital control logic 132 causes the switching regulator 100 to transition to PFM mode by triggering the PFM hysteretic controller 110. Upon transitioning to PFM mode, the current sense circuit 135 estimates the load current $I_{LOAD}$ based on the slope of the waveform of output voltage $V_{OUT}$ of the switching regulator 100 when both N-MOSFET 125 and P-MOSFET 120 switches are off.

At step 240, the current comparator circuit 140 compares the output of the current sense circuit 135 against the current threshold set using the first multiplexer 145, i.e., the lower threshold 'x'. On comparison, if the load current $I_{LOAD}$ is above the lower threshold 'x', then step 245 is performed. Otherwise step 250 is performed.

At step 245, the switching regulator 100 transitions back to the PWM mode. In other words, the digital control logic 132 selects the PWM controller 105 again. Further, the digital control logic 132 causes the pulse filter trip point z to be decremented, to say z2, while the output of the first multiplexer 145 is retained at the lower threshold 'x'. Further, step 225 is repeated.

At step 250, the digital control logic 132 causes the switching regulator 100 to remain in the PFM mode. Further, the output of the first multiplexer 145 is set to the upper threshold 'y'. In the PFM mode, the load current $I_{LOAD}$ is compared against the upper threshold 'y' using the current sense circuit 135 and current comparator circuit 140 as explained earlier using FIG. 2B.

The switching regulator disclosed herein provides a more accurate method of estimating load current, when compared to conventional techniques. Further, the switching regulator has less power loss due to the absence of sense resistor circuits for sensing the load current. The method of estimating the load current using the current sense circuit, the current comparator, the zero crossing detector and the pulse filter disclosed herein may be implemented in other switching regulators including, but not limited to, boost regulators and buck-boost regulators.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method of transitioning a switching regulator from a Pulse Frequency Modulation mode to a Pulse Width Modulation mode, the method comprising:
   measuring a load current in the Pulse Frequency Modulation mode, wherein the load current is measured at an output of the switching regulator by deriving slope of waveform of output voltage at an intersection of an inductor an a load capacitor of the switching regulator, wherein the slope of the waveform of the output voltage is measured during a dead-time of the switching regulator, wherein the dead-time is defined as the time between an instant an NMOS switch is turned OFF by a zero crossing detector to an instant a PMOS switch is turned ON by one of a pulse frequency modulation controller and a pulse width modulation controller;
   determining a current threshold setting to be one of an upper threshold and a lower threshold; and
   transitioning the switching regulator from the Pulse Frequency Modulation mode to the Pulse Width Modulation mode when the load current measured is greater than the upper threshold.

2. The method as claimed in claim 1, wherein the slope of the waveform of the output voltage is derived using a differentiator circuit.

3. The method as claimed in claim 1, wherein the current threshold setting is configured using a first multiplexer, wherein an output of the first multiplexer is set using a first control signal.

4. A method of transitioning a switching regulator from a Pulse Width Modulation mode to a Pulse Frequency Modulation mode, the method comprising:
   determining a current threshold setting for a load current and a pulse filter trip point, wherein the current threshold setting is determined to be one of an upper threshold and a lower threshold, and wherein the switching regulator is in the Pulse Width Modulation mode when the load current is above the upper threshold;
   measuring a dead-time of the switching regulator to estimate the load current in the Pulse Width Modulation mode; and
   transitioning to the Pulse Frequency Modulation mode, when the dead-time is greater than the pulse filter trip point, for estimating the load-current, wherein the load current is estimated in the Pulse Frequency Modulation mode by deriving a slope of a waveform of an output voltage of the switching regulator during the dead-time, and wherein the pulse filter trip point is modified to increase the dead-time after tentative transition to the Pulse Frequency Modulation mode.

5. The method as claimed in claim 4, further comprising continuing operation in the Pulse Frequency Modulation mode when the load current estimated is lower than the lower threshold.

6. The method as claimed in claim 4, further comprising transitioning back to the Pulse Width Modulation mode from the Pulse Frequency Modulation mode when the load current estimated is higher than the lower threshold.

7. The method as claimed in claim 4, wherein the current threshold setting is configured using a first multiplexer, wherein output of the first multiplexer is set using a first control signal.

8. The method as claimed in claim 4, wherein the pulse filter trip point is set using a second multiplexer, wherein an output of the second multiplexer is set using a second control signal.

9. The method as claimed in claim 4, wherein the dead-time is estimated using a pulse filter and a zero crossing detector.

10. A circuit for automatically transitioning from a Pulse Width Modulation mode to a Pulse Frequency Modulation mode and vice-versa, the circuit comprising:
    a zero crossing detector configured to receive a voltage from a switching regulator;
    a multiplexer configured to receive a control signal for selecting a pulse filter trip point from a plurality of pulse filter trip points;

a pulse filter configured to receive outputs of the zero crossing detector and the multiplexer configured for selecting the pulse filter trip point, wherein the pulse filter measures a duration of dead-time in an output voltage of the switching regulator, based on the outputs of the zero crossing detector and the multiplexer configured for selecting the pulse filter trip point;

a current sense circuit configured to receive a voltage from an LC filter circuit, wherein the voltage from the LC filter circuit is dependent on the output voltage of the switching regulator, and wherein an output of the current sense circuit is indicative of a load current of the switching regulator;

a multiplexer configured to receive a control signal for selecting a current threshold setting, wherein the current threshold setting is selected as one of an upper threshold and a lower threshold;

a current comparator circuit configured to compare outputs of the current sense circuit and the multiplexer configured for selecting the current threshold setting; and a digital control logic configured to:
provide control signal to the multiplexer configured for selecting the pulse filter trip point;
provide control signal to the multiplexer configured for selecting the current threshold setting; and
generate a mode select signal for selecting one of a Pulse Width Modulation mode and a Pulse Frequency Modulation mode of operation, wherein the digital control logic generates the control signals and the mode select signal based on outputs of the pulse filter and the current comparator circuit.

11. The circuit as claimed in claim 10, wherein the mode select signal triggers a Pulse Width Modulation controller in the switching regulator for selecting the Pulse Width Modulation mode.

12. The circuit as claimed in claim 10, wherein the mode select signal triggers a Pulse Frequency Modulation hysteretic controller in the switching regulator for selecting the Pulse Frequency Modulation mode.

* * * * *